(12) United States Patent
Hunt

(10) Patent No.: US 11,060,578 B2
(45) Date of Patent: Jul. 13, 2021

(54) CONICAL SPRING WASHER, TRANSMISSION SYSTEM, AND METHOD OF ASSEMBLY THEREOF

(71) Applicant: ALLISON TRANSMISSION, INC., Indianapolis, IN (US)

(72) Inventor: Mickey Jay Hunt, Camby, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 147 days.

(21) Appl. No.: 16/416,966

(22) Filed: May 20, 2019

(65) Prior Publication Data

US 2019/0360546 A1 Nov. 28, 2019

Related U.S. Application Data

(60) Provisional application No. 62/674,714, filed on May 22, 2018.

(51) Int. Cl.
| | |
|---|---|
| *F16F 1/32* | (2006.01) |
| *F16F 3/02* | (2006.01) |
| *F16C 35/06* | (2006.01) |
| *F16C 1/28* | (2006.01) |

(52) U.S. Cl.
CPC ............. *F16F 1/32* (2013.01); *F16C 1/28* (2013.01); *F16C 35/06* (2013.01); *F16F 3/02* (2013.01); *F16F 2230/0052* (2013.01); *F16F 2234/04* (2013.01)

(58) Field of Classification Search
CPC ...... F16F 1/32; F16F 1/324; F16F 3/02; F16F 2230/0052; F16F 2234/04; F16C 35/06

USPC .................................................. 267/161, 162
See application file for complete search history.

(56) References Cited

U.S. PATENT DOCUMENTS

| | | | | |
|---|---|---|---|---|
| 1,893,814 | A * | 1/1933 | Widin | F16C 33/74 267/161 |
| 2,844,644 | A * | 7/1958 | Soule, Jr. | H05K 9/0016 174/354 |
| 3,483,888 | A * | 12/1969 | Wurzel | F16K 15/046 137/539 |
| 4,103,725 | A | 8/1978 | Abe | |
| 4,302,136 | A | 11/1981 | Abe | |

(Continued)

FOREIGN PATENT DOCUMENTS

| | | | | |
|---|---|---|---|---|
| DE | 19919414 | A1 * | 11/2000 | F16F 1/32 |
| EP | 1798441 | A1 * | 6/2007 | F16F 1/324 |
| SU | 1516651 | A1 * | 10/1989 | F16F 1/32 |

OTHER PUBLICATIONS

EPO translation; DE 19919414 A1. (Year: 2000).*

*Primary Examiner* — Thomas J Williams
(74) *Attorney, Agent, or Firm* — Taft Stettinius & Hollister LLP; Stephen F. Rost

(57) ABSTRACT

A conical spring washer includes a symmetrical annular body, a plurality of inner tabs and a plurality of outer tabs formed in the body. Each of the plurality of inner tabs has a width that tapers radially inwardly. Each of the plurality of outer tabs has a maximum width that is greater than a maximum width of each of the plurality of inner tabs. An intermediate portion is defined in the body and disposed between the plurality of inner tabs and plurality of outer tabs. The plurality of inner tabs and plurality of outer tabs are flexibly coupled to the intermediate portion.

20 Claims, 9 Drawing Sheets

(56) References Cited

U.S. PATENT DOCUMENTS

| | | | | |
|---|---|---|---|---|
| 4,542,852 | A | * | 9/1985 | Orth ...................... F25B 41/062 188/381 |
| 4,608,741 | A | * | 9/1986 | Mallet ................... F16C 19/163 29/450 |
| 5,496,142 | A | | 3/1996 | Fodor et al. |
| 6,705,763 | B2 | * | 3/2004 | Kamura .................. B60B 27/00 384/539 |
| 7,918,432 | B2 | | 4/2011 | Taylor, III |
| 2005/0151310 | A1 | * | 7/2005 | Rodeffer ................... F16F 1/32 267/161 |
| 2013/0193801 | A1 | | 8/2013 | Schmid et al. |

\* cited by examiner

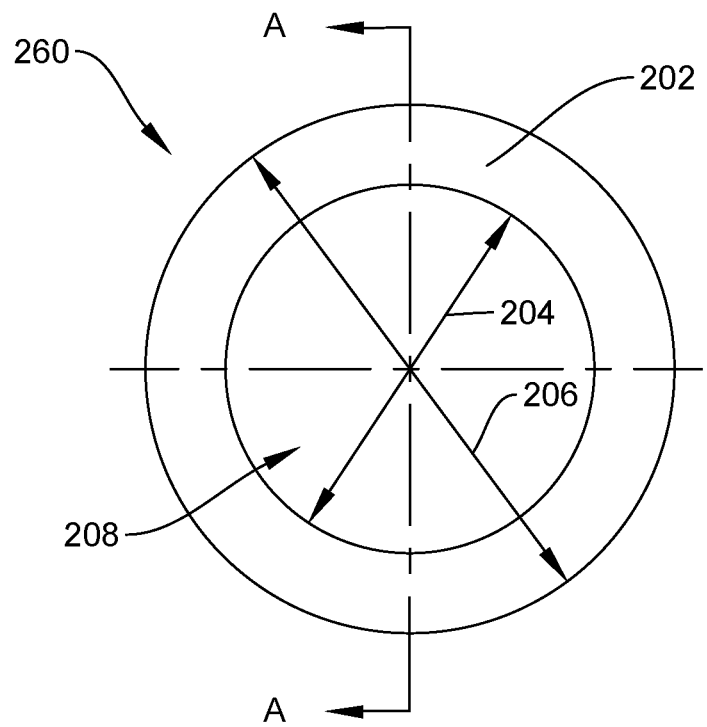
FIG. 2
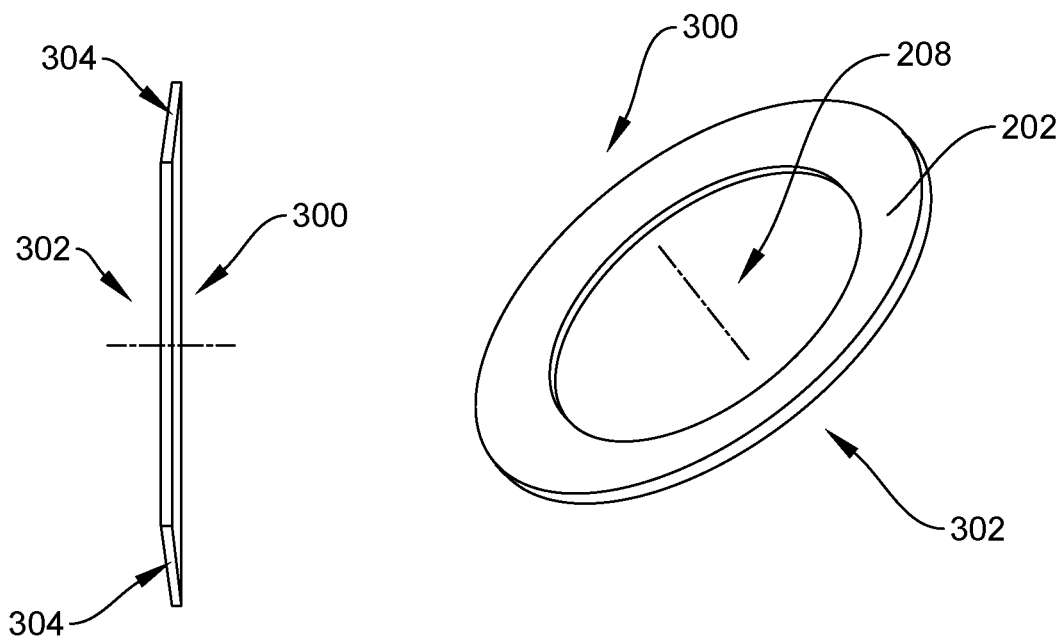
FIG. 3
FIG. 4

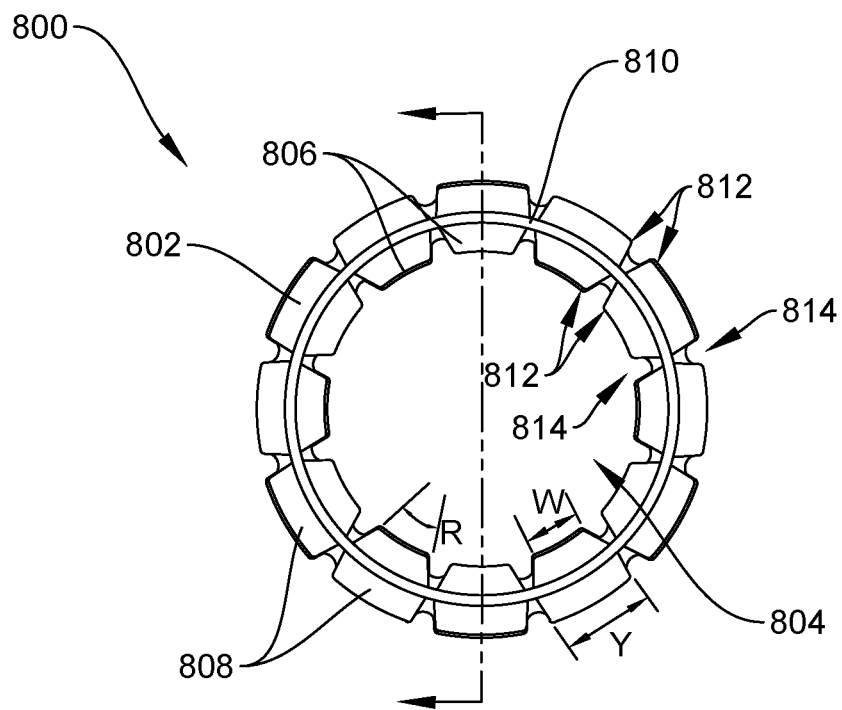
FIG. 8
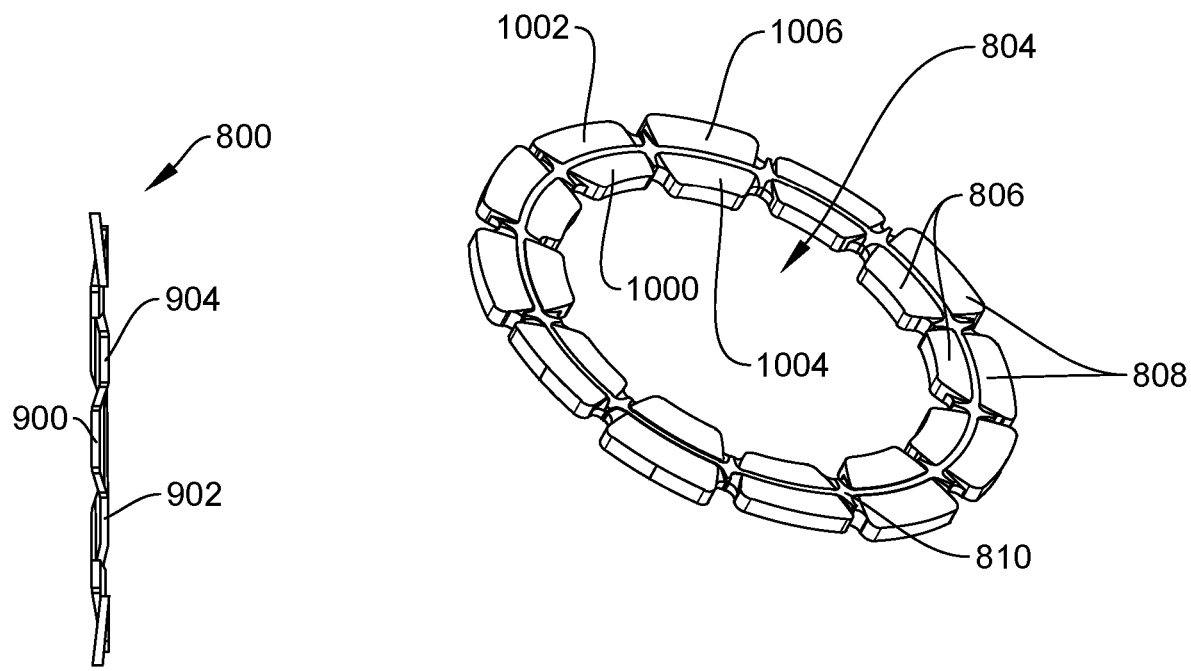
FIG. 9
FIG. 10

CONICAL SPRING WASHER, TRANSMISSION SYSTEM, AND METHOD OF ASSEMBLY THEREOF

RELATED APPLICATIONS

This application claims priority to, and the benefit of, U.S. Provisional Patent Application Ser. No. 62/674,714, filed on May 22, 2018, the disclosure of which is hereby incorporated by reference in its entirety.

FIELD OF THE DISCLOSURE

The present disclosure relates to a conical spring washer, and in particular, to a symmetrical conical spring washer and its assembly in combination with a transmission system.

BACKGROUND

In a conventional transmission assembly, a number of parts and sub-assemblies are assembled together with bearings, hubs, and the like. Many of these assemblies include the use of one or more washers which are installed between two parts and are subjected to wear during use. Moreover, these washers may be used for tolerance reasons. In one such example, one or more washers may be installed between a hub and a bearing to occupy a space defined therebetween for tolerance reasons.

During assembly, conventional conical spring washers are installed in a certain direction to ensure proper assembly. In some instances, an improperly installed washer can move about in the space between parts. If the washer falls into a gap or moves into an undesirable location, the washer may not wear properly or cause potential damage to other parts. There is currently very few preventative measures used to avoid mis-assembly or improper assembly of a conical spring washer in a transmission assembly, and thus a need exists for such measures.

SUMMARY

In one embodiment of the present disclosure, a conical spring washer includes a symmetrical annular body; a plurality of inner tabs formed by the body, each of the plurality of inner tabs having a width that tapers radially inwardly; a plurality of outer tabs formed by the body, each of the plurality of outer tabs having a maximum width that is greater than a maximum width of each of the plurality of inner tabs; and an intermediate portion defined in the body and disposed between the plurality of inner tabs and plurality of outer tabs; wherein, the plurality of inner tabs and plurality of outer tabs are flexibly coupled to the intermediate portion.

In a first aspect of this embodiment, each of the plural of inner tabs is radially aligned with a respective one of the plurality of outer tabs. In a second aspect, the plurality of inner tabs and plurality of outer tabs are pivotally coupled to the intermediate portion. In a third aspect, the plurality of inner tabs comprises a first inner tab and a second inner tab, the first inner tab being disposed radially adjacent the second inner tab, where the first inner tab is disposed in a concave orientation and the second inner tab is disposed in a convex orientation.

In a fourth aspect, the plurality of outer tabs comprises a first outer tab and a second outer tab, the first outer tab being disposed radially adjacent the second outer tab, where the first outer tab is disposed in a concave orientation and the second outer tab is disposed in a convex orientation. In a fifth aspect, each of the plurality of inner tabs is formed by curved edges. In a sixth aspect, each of the plurality of outer tabs is formed by curved edges.

In a seventh aspect of this embodiment, a first outer tab of the plurality of outer tabs is spaced from a radially adjacent second outer tab by a defined gap. In an eighth aspect, each of the plurality of outer tabs is equally spaced from a radially adjacent outer tab by a defined gap. In a ninth aspect, each of the plurality of inner tabs is equally spaced from a radially adjacent inner tab by a defined gap.

In another aspect, a first inner tab and a first outer tab are radially aligned with one another; the first inner tab being disposed in a concave or convex orientation; and the first outer tab being disposed in an opposite orientation of the first inner tab. In a further aspect, each of the plurality of inner tabs is radially aligned with a respective one of the plurality of outer tabs; the plurality of inner tabs alternating between a concave orientation and a convex orientation along an inner circumference of the body; and the plurality of outer tabs alternating between a concave orientation and a convex orientation along an outer circumference of the body. In yet a further aspect, for each of the plurality of inner tabs disposed in a concave orientation, the respective radially aligned outer tab being disposed in a convex orientation; and for each of the plurality of inner tabs disposed in a convex orientation, the respective radially aligned outer tab being disposed in a concave orientation.

In another embodiment of the present disclosure, a transmission assembly includes an outer housing defining an internal cavity; a first body disposed within the internal cavity; a second body disposed within the internal cavity and aligned with the first body; a conical spring washer disposed within the internal cavity at a location between the first body and the second body, the conical spring washer comprising a symmetrical annular body; a plurality of inner tabs formed by the body, each of the plurality of inner tabs having a width that tapers radially inwardly; a plurality of outer tabs formed by the body, each of the plurality of outer tabs having a maximum width that is greater than a maximum width of each of the plurality of inner tabs; and an intermediate portion defined in the body and disposed between the plurality of inner tabs and plurality of outer tabs; wherein, the plurality of inner tabs and plurality of outer tabs are flexibly coupled to the intermediate portion.

In one aspect of this embodiment, the first body comprises a bearing assembly and the second body comprises a hub. In a second aspect, a first inner tab and a first outer tab are radially aligned with one another; the first inner tab being disposed in a concave or convex orientation; and the first outer tab being disposed in an opposite orientation of the first inner tab. In a third aspect, each of the plurality of inner tabs is radially aligned with a respective one of the plurality of outer tabs; the plurality of inner tabs alternating between a concave orientation and a convex orientation along an inner circumference of the body; and the plurality of outer tabs alternating between a concave orientation and a convex orientation along an outer circumference of the body.

In another aspect, for each of the plurality of inner tabs disposed in a concave orientation, the respective radially aligned outer tab being disposed in a convex orientation; and for each of the plurality of inner tabs disposed in a convex orientation, the respective radially aligned outer tab being disposed in a concave orientation. In yet another aspect, each of the plurality of inner tabs and each of the plurality of outer tabs are formed by curved edges In a further embodiment of the present disclosure, a method of assembling a transmission assembly includes providing an outer housing, a first body, a second body, a drive shaft and a symmetrical conical spring washer having a first side and a second side, where the washer is formed by a plurality of inner tabs, a plurality of outer tabs, and an intermediate portion defined therebetween; installing the first body into an internal chamber of the outer housing; inserting the drive shaft into the internal chamber; installing the symmetrical conical spring washer into the internal chamber proximate the first body; coupling the second body to the outer housing and in proximity to the symmetrical conical spring washer, where the symmetrical conical spring washer is disposed in a space between the first body, the second body, and the drive shaft; and compressing the symmetrical conical spring washer into contact between the first body and the second body regardless of a direction in which the first and second sides of symmetrical conical spring washer are oriented.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a planar view of a first embodiment of a conical spring washer;

FIG. 3 is a side view of the conical spring washer of FIG. 2;

FIG. 4 is a perspective view of the conical spring washer of FIG. 2;

FIG. 8 is a planar view of a second embodiment of a conical spring washer;

FIG. 9 is a side view of the conical spring washer of FIG. 8;

FIG. 10 is a perspective view of the conical spring washer of FIG. 8;

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
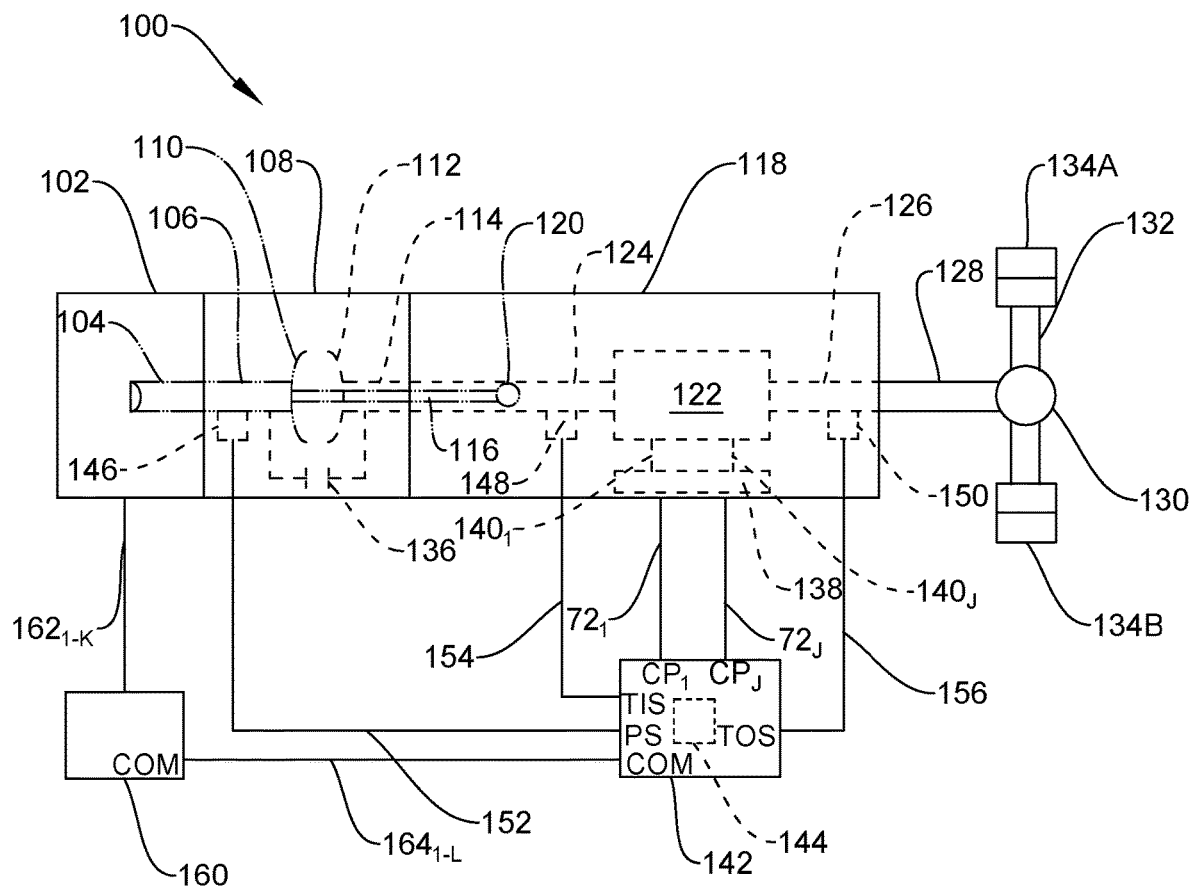
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when torque multiplication is not needed. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed and direction of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system 138 in a conventional manner. For example, the electro-hydraulic system 138 illustratively includes a conventional hydraulic positive displacement pump 120 which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a Society of Automotive Engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Referring to FIGS. 2-4, one embodiment of a conical spring washer 200 is shown. The washer 200 is shown as having a washer body 202 defining an outer diameter 206 and an inner diameter 204. A central opening 208 is defined internally of the inner diameter 204 of the body 202.

In this embodiment, the washer 200 is illustrated as an asymmetrically-shaped conical spring washer. As shown, the washer 200 includes a concave side 300 and a convex side 302. On the convex side 302 of the washer 200, the body 202 includes a radially tapered edge 304 as shown in FIG. 3.

Figure 5:
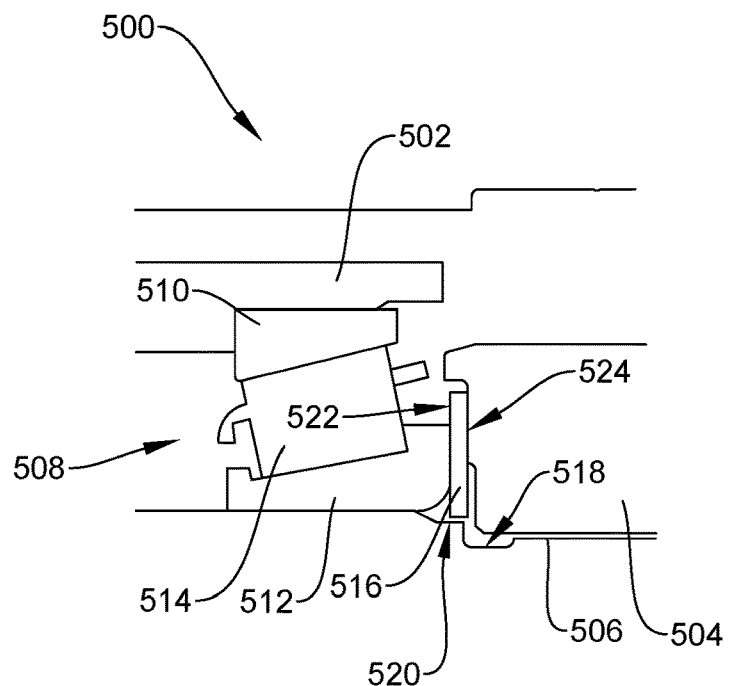
FIG. 5 is a partial cross-sectional schematic of a transmission assembly with the conical spring washer of FIG. 2 in its compressed state.

The washer 200 is capable of being installed in any number of different assemblies. In FIG. 5, for example, the washer 200 is shown being installed in a transmission assembly 500 similar to that depicted in FIG. 1. The assembly 500 may include an outer housing 502 in which a hub 504 and bearing assembly 508 rotatably support a drive shaft 506. The drive shaft 506 may include the turbine shaft 114, pump shaft 116, input shaft 124, output shaft 126 or any other shaft of the transmission 118 of FIG. 1. Moreover, the assembly 500 may be part of something other than a transmission. For instance, it may be part of an engine, differential, retarder, or any other known type of assembly.

In FIG. 5, the bearing assembly 508 is shown as a roller bearing assembly including an inner race 512, an outer race 510, and a roller 514 disposed therebetween. A conical spring washer 516 similar to the washer 200 of FIG. 2 is shown. Here, the washer 516 is configured between the hub 504 and the bearing assembly 508. In its position shown, the washer 516 is disposed in its compressed state of the assembled position. Here, the washer 516 is capable of compensating for tolerances in the stacking of various parts including the hub 504 and bearing assembly 508. In this example, the washer 516 has a first side 522 in contact with the bearing assembly 508 and a second face 524 in contact with the hub 504.

Figure 6:
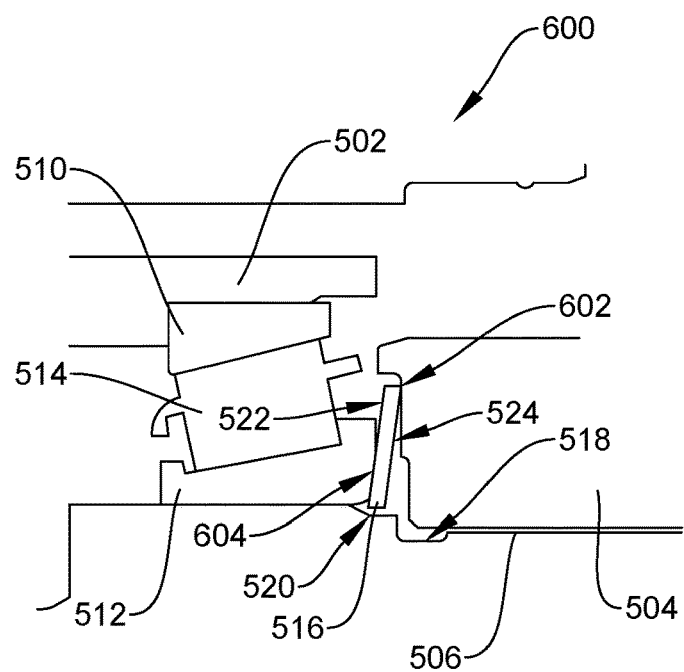
FIG. 6 is a partial cross-sectional schematic of a transmission assembly with the conical spring washer of FIG. 2 in a properly assembled position.

In the example of FIG. 5, the orientation of the conical spring washer 516 is important. Although not shown, the washer 516 includes a concave side and convex side similar to the washer 200 of FIGS. 2-4. In other words, the washer 516 is asymmetrical. In FIG. 6, the washer 516 is shown in a correctly installed orientation or position 600 with respect to the hub 504, drive shaft 506 and bearing assembly 508. Here, the washer 516 is disposed such that the hub 504 exerts a first force 602 to an outermost portion of the second side 524 of the washer 516, and the bearing assembly 508 exerts a second force 604 against the first side 522 of the washer 516. In the illustrated example, the second force 604 is at a location radially inward of the first force 602. The location of forces applied by the hub 504 and bearing assembly 508 provide for a proper orientation of the washer 516 when torque is applied to the hub 504 and the washer 516 moves to its compressed state of FIG. 5.

Figure 7:
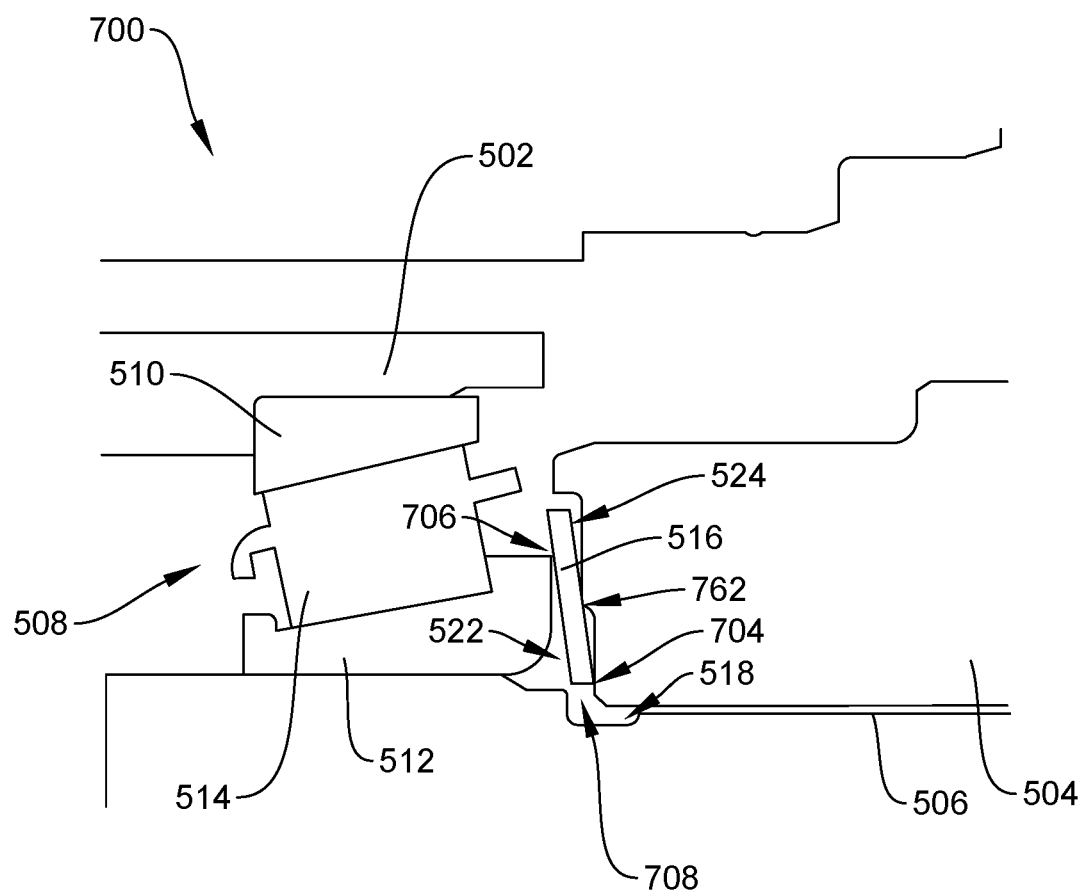
FIG. 7 is a partial cross-sectional schematic of a transmission assembly with the conical spring washer of FIG. 2 in an improperly assembled position.

An issue can arise, however, if the washer 516 is misassembled or improperly installed in the assembly 500. An example of this is shown in FIG. 7 where the conical spring washer 516 is installed backwards. In FIG. 6, the concave side 300 faced the hub 504, but in the example of FIG. 7 the concave side 300 is facing the bearing assembly 508. As shown, a space between the bearing assembly 508, the hub 504 and the shaft 506 may define a groove 518 as shown. A bottom or inner most edge 708 of the conical washer 516 is disposed in a misaligned orientation 700 such that the edge 708 is not supported by an outer surface 520 of the shaft 506. Instead, the edge 708 is disposed above the groove 518 such that the washer 516 may fall into the groove 518 during installation.

In the event the washer 516 falls into or becomes disposed in the groove 518, the hub 504, bearing assembly 508, and other stacked parts are out-of-balance and the result may be improper wear over time. Other consequences may include possible fatigue or failure of one or more parts over time. This may be due to the resultant forces acting against the washer 516. For example, in FIG. 7, the washer 516 may be subjected to a first force 702 by the hub 504, a second force 704 by the hub 504, and a third force 706 by the bearing assembly 508. Here, the third force 706 applied by the bearing assembly 508 is at a location radially outward of the two forces applied by the hub 504 against the washer 516. The combination of these three forces may cause the conical spring washer 516 to become misaligned and fall into the groove 518.

The conical spring washer of FIGS. 2 and 5 may be used for several applications. For instance, the washer may be used as a static load, where adjacent parts compress against the washer continuously to induce wear. In another application, the washer can oscillate like a spring. As noted above, many washers are used as shims to occupy space for tolerance reasons. Other applications are possible as well. In the embodiment of FIGS. 5-7, the washer 516 is a static load washer used for tolerance and wear reasons.

When the washer 516, however, is improperly installed as it is in FIG. 7, it can be difficult to detect this during assembly. This can be especially difficult to detect this in the field when an assembly is being repaired or a component of the assembly is being replaced. For instance, it can be difficult to visually detect when the washer is improperly installed. Thus, conical spring washers having an asymmetrical shape, i.e., with a concave side, present challenges due to their size and shape if installed improperly.

In FIGS. 8-10, a different embodiment of a conical spring washer 800 is shown. The washer 800 can be formed of any desirable material including spring steel, stainless steel, and the like. In this embodiment, the conical spring washer 800 is symmetrical unlike that of FIGS. 2-7. In other words, the washer 800 is not concave in one direction, which is advantageous during assembly as the washer 800 can be installed in either direction. The washer 800 includes a washer body 802 formed by inner and outer diameters and a central opening 804 defined therethrough. The body 802 may be formed by a plurality of tabs as shown in FIG. 8. Here, the plurality of tabs includes a plurality of inner tabs 806 and a plurality of outer tabs 808. Each of the plurality of inner tabs 806 may be disposed radially inward of a respective one of the plurality of outer tabs 808 as shown in FIG. 8.

As also shown in FIG. 8, each of the tabs includes curved or rounded edges 812 to avoid any sharp or pointy edges. This can be advantageous for manufacturing reasons. Further, the outer tabs 808 have a larger width, y, compared to the width, w, of the inner tabs 806. Due to the size difference between the inner tabs 806 and the outer tabs 808, the washer 800 may include the same number of inner tabs 806 and outer tabs 808.

Moreover, an intermediate or center flex portion 810 is located between the plurality of inner tabs 806 and plurality of outer tabs 808. The intermediate portion 810 may be defined within a reference plane, and the inner and outer tabs may be partially disposed within the plane. Each of the plurality of inner and outer tabs may flex or pivot about the intermediate portion 810 as the washer 800 is compressed. To allow for this flexing or pivotal movement of each tab, each of the plurality of inner tabs 806 and outer tabs 808 is spaced by a gap 814 defined between each pair of adjacent tabs. Due to the flexing or pivotal movement, each tab is conditioned to reduce shear and provide increased flexibility to the washer 800.

As noted above, the symmetrical conical spring washer 800 does not include a concave side and a convex side. In the embodiment of FIG. 9, however, each of the plurality of tabs may alternate between being disposed in a concave or convex direction. For example, a first tab 900 may be concave, a second tab 902 may be convex, and a third tab 904 may be concave, and so forth. The tabs may alternate between being concave or convex around the circumference of the washer 900.

Stated another way, the intermediate portion 810 may be defined within the reference plane, and each of the plurality of inner tabs 806 and outer tabs 808 may be integrally coupled with the intermediate portion 810 at a proximal end thereof. The proximal end of each of the plurality of tabs may be disposed within the reference plane. However, the distal end of each of the inner and outer tabs may be located to either side of the plane. For instance, a distal end of a first inner tab 816 may be located to a first side of the reference plane. The distal end of an immediately adjacent second inner tab 818, however, may be located to a second side of the reference plane, where the first side is opposite the second side. This alternating arrangement of the plurality of inner tabs 806 may continue around the inner radial periphery of the body 802.

Likewise, a distal end of a first outer tab 820 that is radially aligned with the first inner tab 816 may be oriented such that it is located to the second side of the reference plane. Thus, the first inner tab 816 is located to the first side of the plane, and the first outer tab 820 is located to the second side thereof. A distal end of an immediately adjacent second outer tab 822 may be located to the first side of the plane. Thus, the second outer tab 822 is located to an opposite side of the reference plane from the first outer tab 820. Moreover, the second outer tab 822 is located to an opposite side of the plane from the second inner tab 818. This alternating arrangement may continue around the outer radial periphery of the body 802.

This alternating relationship between concave and convex may also be illustrated in FIG. 10 as it applies to the inner and outer tabs. In FIG. 10, for example, a first inner tab 1000 may be disposed in a concave manner whereas a second inner tab 1004 may be disposed in a convex manner. Likewise, a first outer tab 1002 may be disposed radially outward of the first inner tab 1000. With the first inner tab 1000 being concave, the first outer tab 1002 may be convex. Likewise, a second outer tab 1006 may be disposed radially outward of the second inner tab 1004. With the second inner tab 1004 being convex, the second outer tab 1006 may be concave. As such, the washer 800 is formed by a plurality of inner tabs 806 and a plurality of outer tabs 808 where the plurality of inner tabs alternate between being concave and convex with an adjacent tab, and the plurality of outer tabs 808 alternate with one another between being concave and convex. Likewise, radially aligned inner and outer tabs may alternate with one another between being concave and convex, as shown in FIGS. 8-10.

Figure 11:
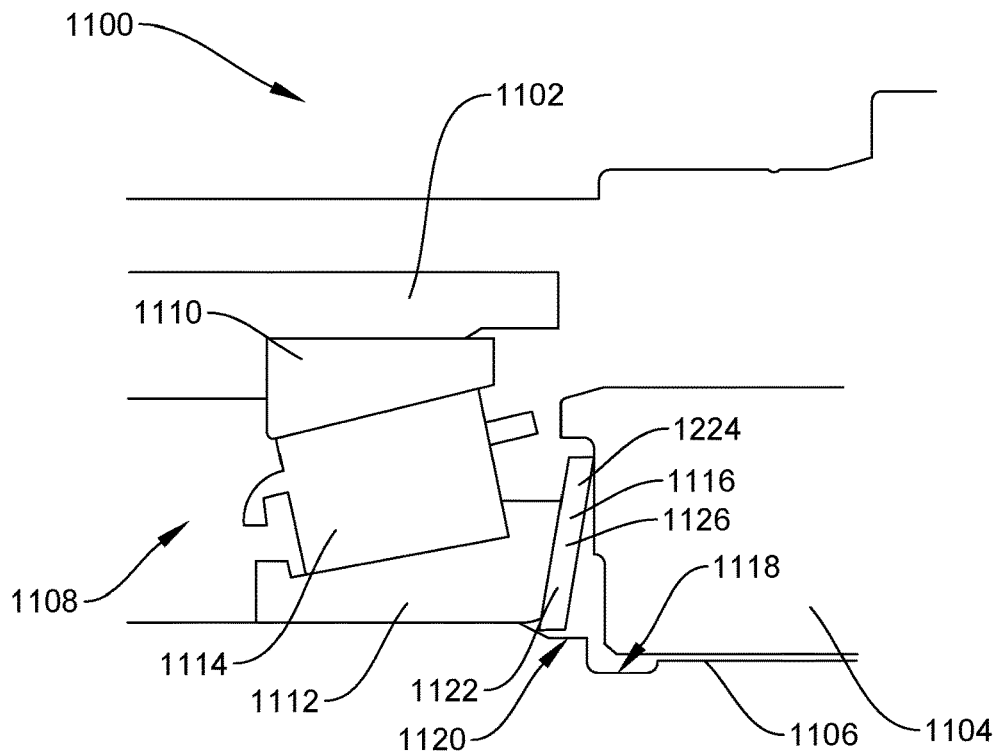
FIG. 11 is a partial cross-sectional schematic of a transmission assembly with the conical spring washer of FIG. 8 in an assembled position.
Figure 12:
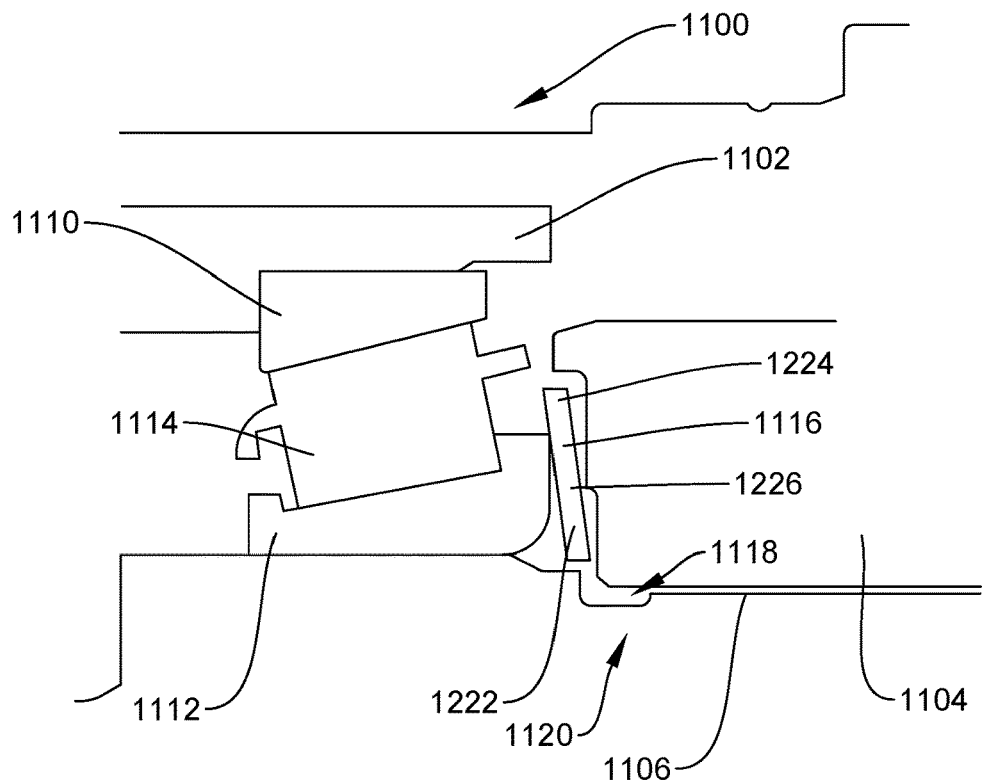
FIG. 12 is another partial cross-sectional schematic of the transmission assembly of FIG. 11 with the conical spring washer of FIG. 8 in an assembled position.

In FIGS. 11-12, an assembly 1100 similar to that of FIG. 5 is shown. The assembly 1100 may be part of a transmission 118, engine, drivetrain, etc. The assembly 1100 is shown having an outer housing 1102. A drive hub 1104 is shown disposed within the housing 1102, along with a drive shaft 1106 and a bearing assembly 1108. Similar to FIG. 5, the drive shaft 1106 may include a turbine shaft 114, pump shaft 116, input shaft 124, output shaft 126 or any other shaft of the transmission 118 of FIG. 1. The bearing assembly 1108 may include an outer race 1110, an inner race 1112, and a roller 1114 disposed therebetween. Other types of bearings may be used as well.

A symmetrical conical spring washer 1116 may be disposed between the hub 1104 and the bearing assembly 1108. In FIG. 11, the cross-sectional view of the washer 1116 is through a first inner tab 1122 and a first outer tab 1124, whereas in FIG. 12 the cross-sectional view of the same washer 1116 is through an adjacent pair of a second inner tab 1222 and a second outer tab 1224. The washer 1116 includes an intermediate or center flex portion 1126 between the inner and outer tabs as shown in FIGS. 11-12.

In FIG. 11, a groove 1118 is shown defined in an area or space between the drive shaft 1106, the hub 1104, and the bearing assembly 1108. The groove 1118 is further located adjacent an outer surface 1120 of the drive shaft 1106 upon which the inner tab 1122 may come into contact with. Based on the orientation of the first inner tab 1122 relative to the outer surface 1120 of the drive shaft 1106, the washer 1116 is unable to fall within the groove 1118 due to contact between the inner tab 1122 and the outer surface 1120.

In FIG. 12, the second inner tab 1222 is angled or oriented such that it is not located above the outer surface 1120 of the drive shaft 1106. Instead, it is oriented above the groove 1118. Even though it appears the second inner tab 1222 may fall or move into the groove 1118, the orientation and positioning of the first inner tab 1122 relative to the outer surface 1120 and groove 1118 maintains proper installation of the washer 1116 during assembly. Thus, the symmetrical conical spring washer 1116 may be installed in the assembly 1100 in any direction or orientation relative to the hub 1104 and bearing assembly 1108 without falling into the groove 1118 or causing issues with tolerances and the like.

Figure 13:
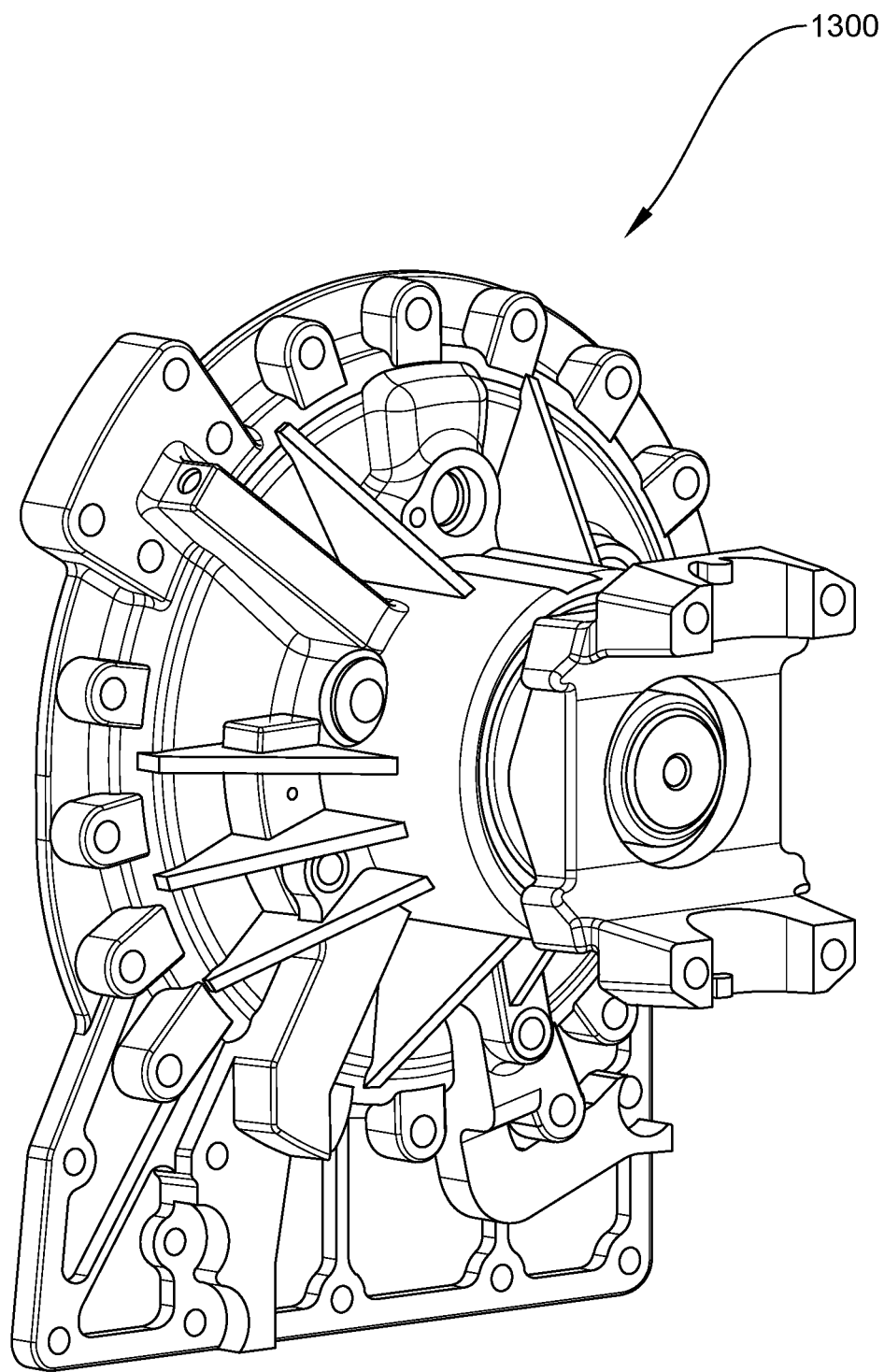
FIG. 13 is a perspective view of a housing assembly of a transmission assembly.
Figure 14:
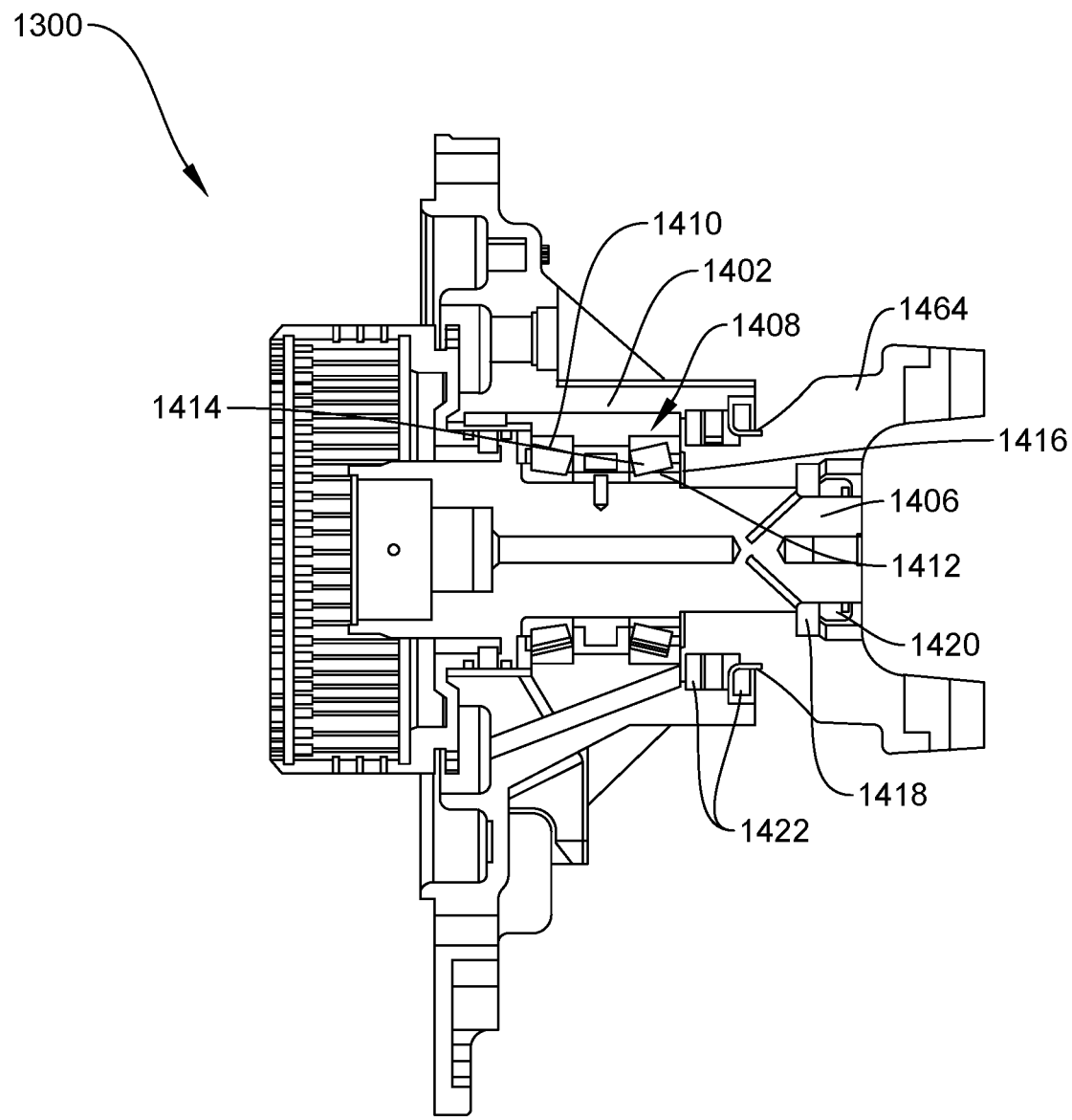
FIG. 14 is a cross-sectional view of the housing assembly of FIG. 13.

Referring now to FIGS. 13-14, a rear cover assembly 1300 of a transmission is illustrated. Referring specifically to FIG. 14, the assembly 1300 may include an outer housing 1402 or cover. The outer housing 1402 may define an internal cavity in which a drive shaft 1406 such as the output shaft 126 is located. In this embodiment, the rear cover assembly 1300 may bolt or otherwise be mounted to a transmission housing or case.

The assembly 1300 may include a drive hub 1404 such as an output yolk. A bearing assembly 1408 comprising an inner race 1412, an outer race 1410, and a roller 1414 therebetween. An output nut 1418 is located adjacent the drive hub 1404 on a side opposite the bearing assembly 1408. Moreover, a seal 1420 may be disposed outwardly of the output nut 1418.

In this assembly 1300, a symmetrical conical washer spring 1416 may be installed between the bearing assembly 1408 and the drive hub 1404. The washer 1416 may include a similar shape as the symmetrical conical spring washer of FIGS. 8-12. In other words, the washer 1416 may include a plurality of inner and outer tabs disposed in alternating concave and convex orientations relative to an intermediate or center flex portion. Each of the plurality of inner and outer tabs may flex or pivot about the intermediate portion to provide desirable tolerance and improved shear to the overall assembly. Moreover, the washer 1416 may be oriented in any direction without causing undue wear, improper installation or damage to the rest of the assembly 1300.

Other designs of a symmetrical conical spring washer may be used. For instance, a washer having a wavy or undulated design may be used. Another design may be to couple concave washers back-to-back such that the washer is symmetrical. These designs may wear more easily compared to the washer of FIGS. 8-12, but may be useful in low pressure applications.

Figure 15:
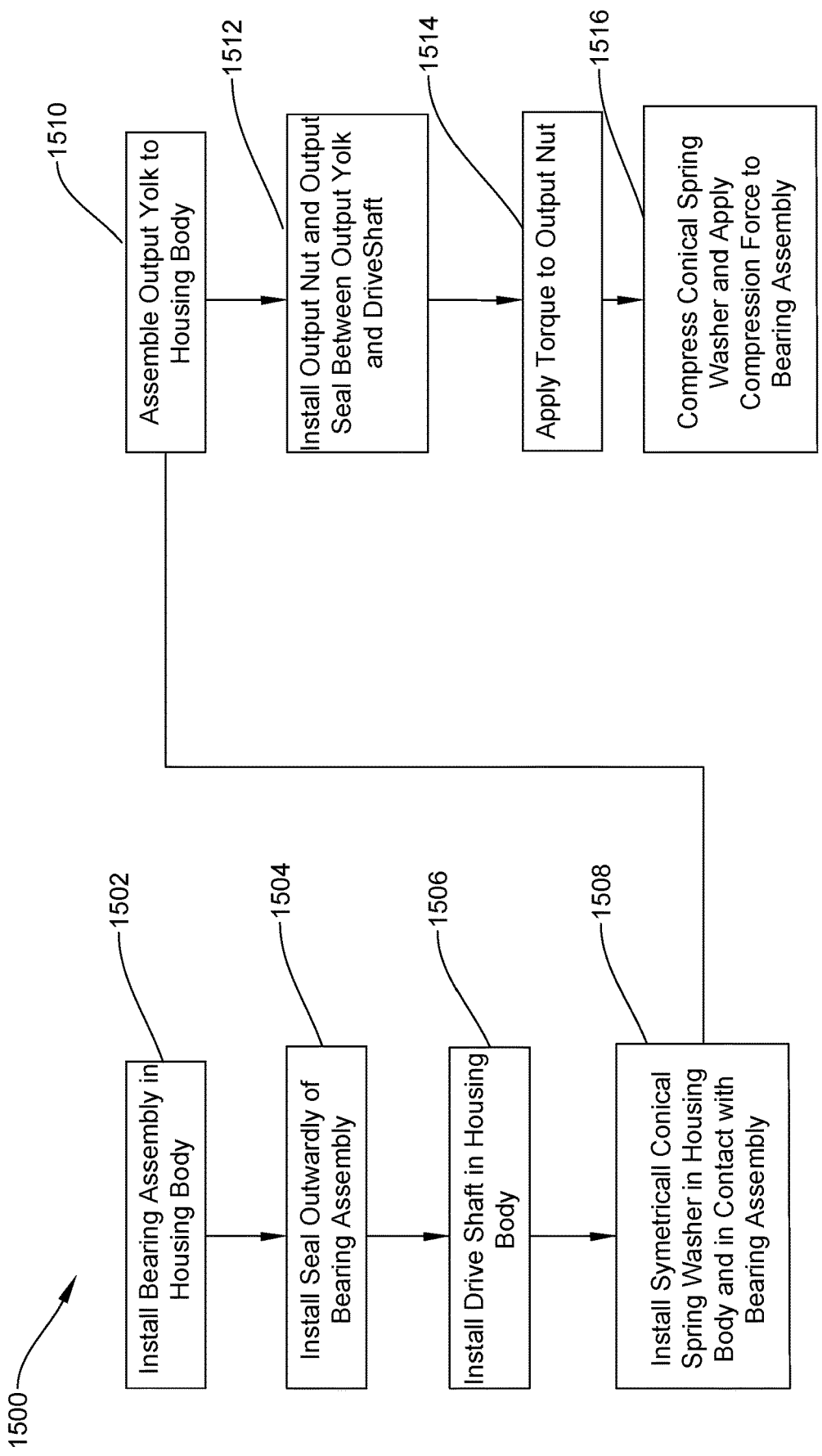
FIG. 15 is a flow diagram of a method of assembling a conical spring washer in the housing assembly of FIG. 13.

Referring to FIG. 15, another embodiment of the present disclosure is provided in which a method of assembly is illustrated. Here, the method 1500 is described relative to assembling the rear cover assembly 1300 of FIG. 13, but the principle teachings may be applied to any assembly that uses a symmetrical conical spring washer. The method 1500 may include a plurality of blocks or steps for executing the method. It is to be understood, however, that the method 1500 shown in FIG. 15 and described herein is only an example and is not intended to be limiting in any way. Moreover, the blocks or steps are presented in a certain sequential order, but it is to be understood that one or more of the blocks or steps may not be executed. Further, there may be additional blocks or steps executed in a related embodiment. In addition, the blocks or steps may be executed in a different order than as shown in FIG. 15 and described herein.

Referring to FIG. 15, the method 1500 may include a first block 1502 in which a housing body 1402, a drive hub 1404, a drive shaft 1406, a bearing assembly 1408, a symmetrical conical washer 1416, an output nut 1418 and a seal 1420 are provided. The bearing assembly 1408 may be installed in the outer housing body 1402 in block 1502. In one example, there may be multiple bearings 1408 installed. Once installed, the method 1500 may advance to block 1504 in which a seal 1422 or seals is installed outwardly of the bearing assembly 1408. The seals 1422 may be pressed into the housing body 1402, for example.

In block 1506, the drive shaft 1406 may be inserted into the housing body 1402 such that it is disposed within an opening defined by the bearing assembly 1408. The inner race 1412 of the bearing assembly 1408 may contact the outer surface of the drive shaft 1406 in this position. In block 1508, the symmetrical conical spring washer 1416 may be installed in any direction in the housing body 1402. Here, the washer 1416 may be located in contact with the bearing assembly 1408, for example, or there may be a gap therebetween. Once the washer 1416 is installed in block 1508, the method 1500 may advance to block 1510 in which the hub 1402 or output yolk is assembled to the housing body 1402. A fastener such as a bolt may threadably couple the output yolk to the drive shaft 1406 so that the yolk 1402 and shaft 1406 rotate in unison. The output yolk 1402 may be further coupled to an impellor shaft or driveline 128 as described above.

An output nut 1418 and output seal 1420 may next be installed in block 1512. Here, the nut 1418 may be installed between the yolk 1402 and drive shaft 1406. Once the nut 1418 and seal 1420 are installed, the method 1500 may advance to block 1514 in which torque is applied to the output nut 1418. As torque is applied, the method 1500 advances to block 1516 where the conical spring washer 1416 is compressed between the drive hub/output yoke 1402 and the bearing assembly 1408 to allow for proper tolerances and wear. The washer 1416 may further apply a compression force against the bearing assembly 1408 in the assembled position. The rear cover assembly 1300 is assembled and the symmetrical conical spring washer 1416 may be inserted in either direction to achieve the assembled position.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A conical spring washer, comprising:
   a symmetrical annular body;
   a plurality of inner tabs formed by the body, each of the plurality of inner tabs having a width that tapers radially inwardly;
   a plurality of outer tabs formed by the body, each of the plurality of outer tabs having a maximum width that is greater than a maximum width of each of the plurality of inner tabs; and
   an intermediate portion defined in the body within a reference plane and located between the plurality of inner tabs and plurality of outer tabs;
   wherein, the plurality of inner tabs and plurality of outer tabs are flexibly coupled to the intermediate portion,
   wherein, each of the plurality of inner tabs is radially aligned with a respective one of the plurality of outer tabs;
   wherein, the plurality of inner tabs alternate between a first side of the reference plane and a second side of the reference plane along an inner radius of the body; and
   wherein, the plurality of outer tabs alternate between the first side of the reference plane and the second side of the reference plane along an outer radius of the body.

2. The conical spring washer of claim 1, wherein the conical spring washer is configured for installation between a first body and a second body of a transmission assembly regardless of a direction in which a first side of the conical spring washer and a second side of the conical spring washer arranged opposite the first side are oriented.

3. The conical spring washer of claim 1, wherein the plurality of inner tabs and the plurality of outer tabs are pivotally coupled to the intermediate portion.

4. The conical spring washer of claim 1, wherein:
the plurality of inner tabs comprises a first inner tab and a second inner tab, the first inner tab being disposed radially adjacent the second inner tab, and
a distal end of the first inner tab is located to the first side of the reference plane and a distal end of the second inner tab is disposed to the second side of the reference plane.

5. The conical spring washer of claim 1, wherein:
the plurality of outer tabs comprises a first outer tab and a second outer tab, the first outer tab being disposed radially adjacent the second outer tab, and
a distal end of the first outer tab is located to the first side of the reference plane and a distal end of the second outer tab is located to the second side of the reference plane.

6. The conical spring washer of claim 1, wherein each of the plurality of inner tabs is formed by curved edges.

7. The conical spring washer of claim 1, wherein each of the plurality of outer tabs is formed by curved edges.

8. The conical spring washer of claim 1, wherein a first outer tab of the plurality of outer tabs is spaced from a radially adjacent second outer tab by a defined gap.

9. The conical spring washer of claim 1, wherein each of the plurality of outer tabs is equally spaced from a radially adjacent outer tab by a defined gap.

10. The conical spring washer of claim 1, wherein each of the plurality of inner tabs is equally spaced from a radially adjacent inner tab by a defined gap.

11. The conical spring washer of claim 1, wherein:
a first inner tab and a first outer tab are radially aligned with one another;
the first inner tab is disposed in a concave or convex orientation relative to the reference plane; and
the first outer tab is disposed in an opposite orientation of the first inner tab relative to the reference plane.

12. The conical spring washer of claim 1, wherein:
the plurality of inner tabs alternate between a concave orientation and a convex orientation along an inner radius of the body relative to the reference plane; and
the plurality of outer tabs alternate between a concave orientation and a convex orientation along an outer radius of the body relative to the reference plane.

13. The conical spring washer of claim 12, wherein:
for each of the plurality of inner tabs disposed in the concave orientation relative to the reference plane, the respective radially aligned outer tab is disposed in the convex orientation relative to the reference plane; and
for each of the plurality of inner tabs disposed in the convex orientation relative to the reference plane, the respective radially aligned outer tab is disposed in the concave orientation relative to the reference plane.

14. A transmission assembly, comprising:
an outer housing defining an internal cavity;
a first body disposed within the internal cavity;
a second body disposed within the internal cavity and aligned with the first body;
a conical spring washer disposed within the internal cavity at a location between the first body and the second body, the conical spring washer comprising:
a symmetrical annular body;
a plurality of inner tabs formed by the body, each of the plurality of inner tabs having a width that tapers radially inwardly;
a plurality of outer tabs formed by the body, each of the plurality of outer tabs having a maximum width that is greater than a maximum width of each of the plurality of inner tabs; and
an intermediate portion defined in the body and within a reference plane, the intermediate portion being located between the plurality of inner tabs and plurality of outer tabs;
wherein, the plurality of inner tabs and plurality of outer tabs are flexibly coupled to the intermediate portion;
wherein, each of the plurality of inner tabs is radially aligned with a respective one of the plurality of outer tabs;
wherein, the plurality of inner tabs alternate between a first side of the reference plane and a second side of the reference plane along an inner radius of the body; and
wherein, the plurality of outer tabs alternate between the first side of the reference plane and the second side of the reference plane along an outer radius of the body.

15. The transmission assembly of claim 14, wherein the first body comprises a bearing assembly and the second body comprises a hub.

16. The transmission assembly of claim 14, wherein:
a first inner tab and a first outer tab are radially aligned with one another;
a distal end of the first inner tab is located to the first side of the reference plane;
and a distal end of the first outer tab is located to the second side of the reference plane.

17. The transmission assembly of claim 14, wherein the conical spring washer is installed between the first body and the second body regardless of a direction in which a first side of the conical spring washer and a second side of the conical spring washer arranged opposite the first side are oriented.

18. The transmission assembly of claim 14, wherein:
for each of the plurality of inner tabs located to the first side of the reference plane, the respective radially aligned outer tab is located to the second side of the reference plane; and
for each of the plurality of inner tabs located to the second side of the reference plane, the respective radially aligned outer tab is located to the first side of the reference plane.

19. The transmission assembly of claim 14, wherein each of the plurality of inner tabs and each of the plurality of outer tabs comprise curved edges.

20. A method of assembling a transmission assembly, comprising:
providing an outer housing, a first body, a second body, a drive shaft, and a symmetrical conical spring washer having a first side and a second side, wherein the washer is formed by a plurality of inner tabs, a plurality of outer tabs, and an intermediate portion defined therebetween;
installing the first body into an internal chamber of the outer housing;
inserting the drive shaft into the internal chamber;
installing the symmetrical conical spring washer into the internal chamber proximate the first body;
coupling the second body to the outer housing and in proximity to the symmetrical conical spring washer, wherein the symmetrical conical spring washer is disposed in a space between the first body, the second body, and the drive shaft; and compressing the symmetrical conical spring washer into contact between the first body and the second body regardless of a direction in which the first and second sides of the symmetrical conical spring washer are oriented.

* * * * *